Sept. 26, 1961  J. G. THIBODAUX, JR., ET AL  3,001,363
SPHERICAL SOLID-PROPELLANT ROCKET MOTOR
Filed March 4, 1958  3 Sheets-Sheet 1

INVENTORS
JOSEPH G. THIBODAUX, JR.
ROBERT L. SWAIN
CARL M. STYLES

BY

ATTORNEYS

Sept. 26, 1961    J. G. THIBODAUX, JR., ET AL    3,001,363
SPHERICAL SOLID-PROPELLANT ROCKET MOTOR
Filed March 4, 1958    3 Sheets-Sheet 2

INVENTORS
JOSEPH G. THIBODAUX, JR.
ROBERT L. SWAIN
CARL M. STYLES

BY
ATTORNEYS

Sept. 26, 1961   J. G. THIBODAUX, JR., ET AL   3,001,363
SPHERICAL SOLID-PROPELLANT ROCKET MOTOR
Filed March 4, 1958   3 Sheets-Sheet 3
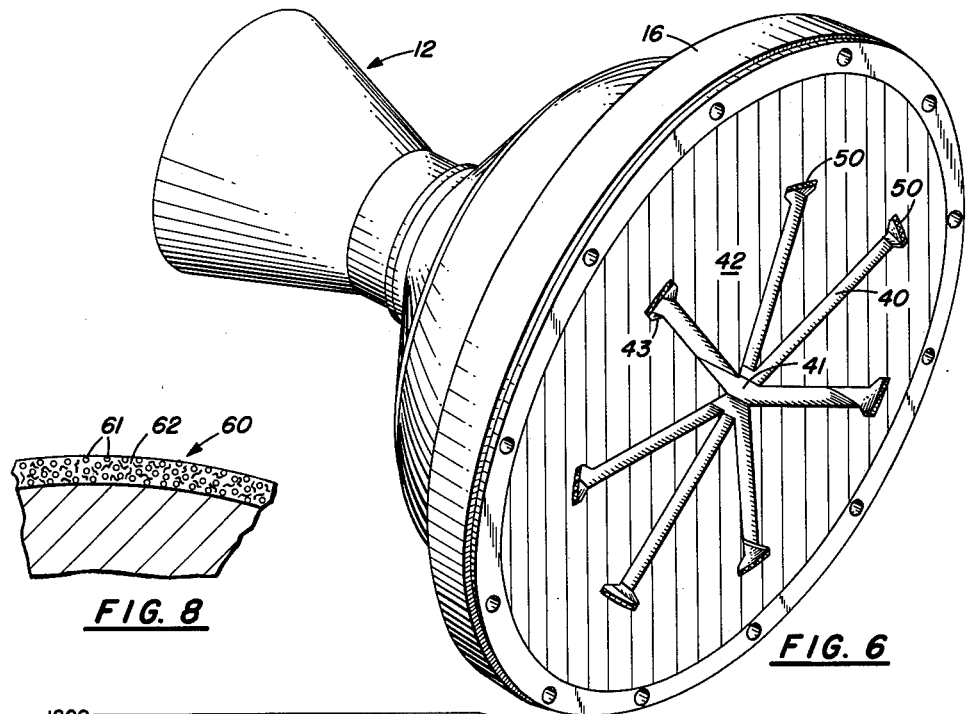
FIG. 8
FIG. 6
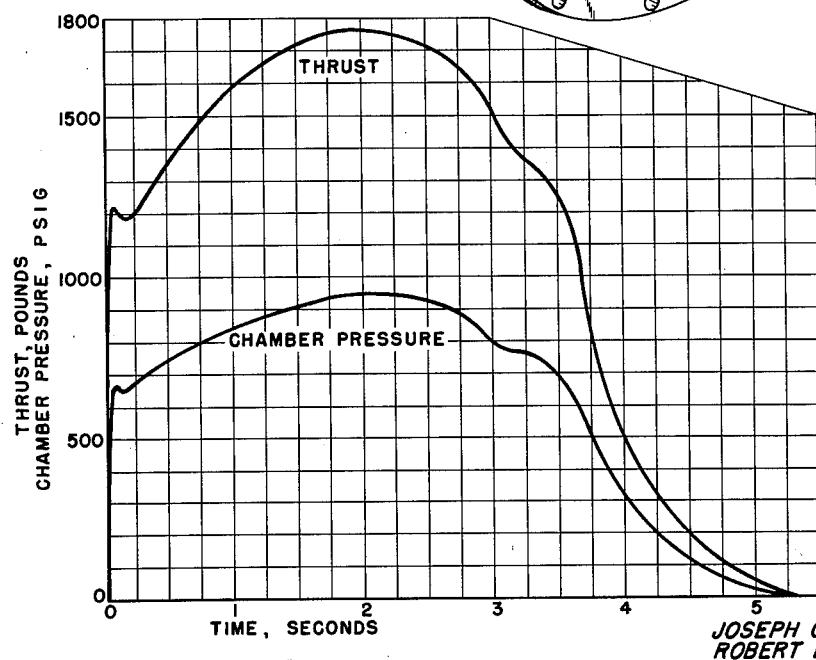
FIG. 7
INVENTORS
JOSEPH G. THIBODAUX, JR.
ROBERT L. SWAIN
CARL M. STYLES
BY
ATTORNEYS

United States Patent Office 3,001,363
Patented Sept. 26, 1961

3,001,363
SPHERICAL SOLID-PROPELLANT ROCKET MOTOR
Joseph G. Thibodaux, Jr., and Robert L. Swain, Warwick, and Carl M. Styles, Hampton, Va., assignors, by mesne assignments, to the United States of America as represented by the Administrator of the National Aeronautics and Space Administration
Filed Mar. 4, 1958, Ser. No. 719,173
2 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to solid propellant rockets with particular applicability to rockets of spherical shape. Solid propellant rockets have been devised for propelling ballistic missiles, earth satellites and space craft but these rockets have generally taken the form of cylinders, which, in comparison with spherical motors of comparable thrust, burning time and operating pressure, are heavier, have lower loading densities, lower impulse to weight ratios and are more difficult to stabilize inertially by rotation about their axes.

The general object of the invention therefore is to produce a rocket which is lighter than a cylindrical rocket of comparable operating characteristics and ballistic performance and, at the same time, has higher loading densities, higher impulse to weight ratios, higher vacuum velocities for a given payload, and greater ease in achieving inertial stabilization. An important object also is to provide a rocket container in which solid propellant masses may be inserted of intricate form and substantial burning areas without disassembly or disturbance of the container. Still another object is to provide structure in a rocket shell for forming the propellant charge and subsequently remove the forming structure without container or propellant disturbance. An object also is to provide means for removing support structure film from the charge surfaces without opening the rocket container. Other objects include means for providing radially burning charge surfaces in a spherical rocket container, for providing a spherical rocket in which the contained charge is self-supported, and for providing a spherical rocket in which the charge contours are such as to minimize resonance.

Other objects and many of the attendant advantages of this invention will be readily appreciated as the same becomes better understood by reference to the following detailed description when considered in connection with the accompanying drawings wherein:

FIG. 6 is a perspective view of the completed rocket with the charge in place and showing a part of the igniter;

FIG. 7 is a curve showing the performance in thrust and chamber pressure for a tested rocket; and FIG. 8 is a detail sectional view of a casing formed of glass fibres.

Figure 1:
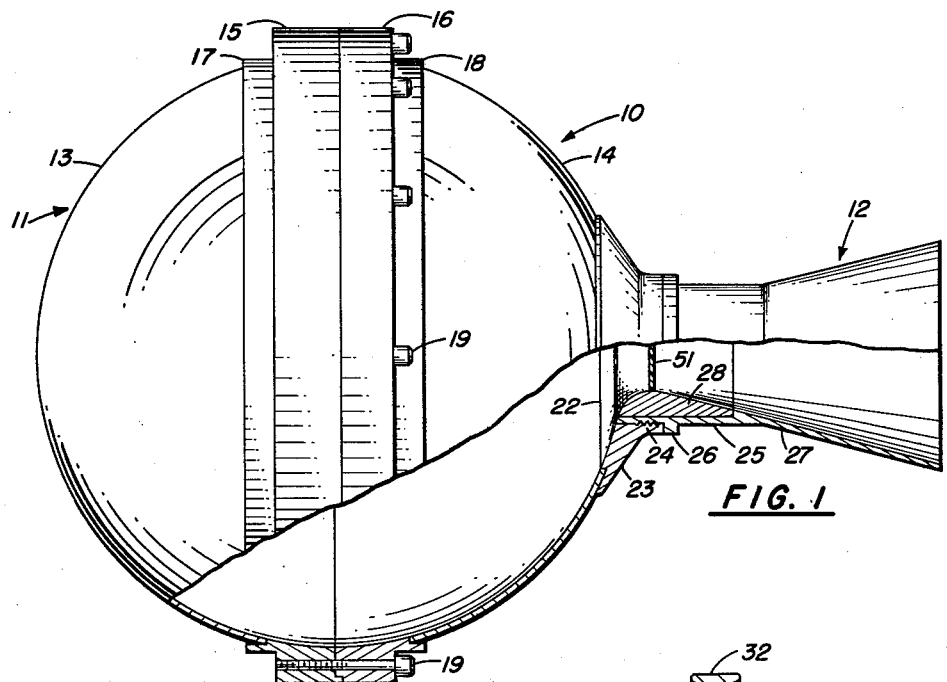
FIG. 1 is a side view of the rocket with parts broken away to show the internal shell and nozzle structure.

Referring to FIG. 1 there is shown a rocket 10 incorporating the invention, this rocket including a spherical shell 11 and a nozzle 12 connected to the shell. The shell 11 is preferably formed in hemispheres 13 and 14 of 0.063 inch SAE 4130 steel, the diametric openings having circumferential bands 15 and 16, each band having an inner flange 17 and 18 projecting over and welded to the half-shell edges. Spaced alined holes are drilled through the sides of the bands 15, 16, the holes in band 15 being threaded to receive cap screws 19, whereby the bands and hence the shell halves are held firmly together to form a spherical unit.

The trailing shell half 14 is formed with an exit opening 22 for the outlet nozzle, the opening edge being reinforced by an annular plate 23 overlying the shell edge and attached thereto, as by welding, and centrally terminating in an internally threaded cylindrical coupler 24. Screw threaded to this coupler is a cylindrical tube 25, the inner end of which is externally threaded to engage the coupler 24, an annular flange 26 on the tube 25 forming a terminating abutment to screw movement. Integral with and in extension of the exit end of tube 25 is a tubular flared section 27, which with the tube 25 forms the exit nozzle 12. To complete the nozzle structure, the inner surface of tube 25 is provided with a graphite insert 28, the thickness of which varies so as to continue the taper of nozzle section 27 to a point short of the inner end of tube 25, at which point the thickness diminishes in a sharp curve to the inner tube end. By use of this insert, the appropriate throat area of the nozzle for most effective action is determined.

Figure 3:
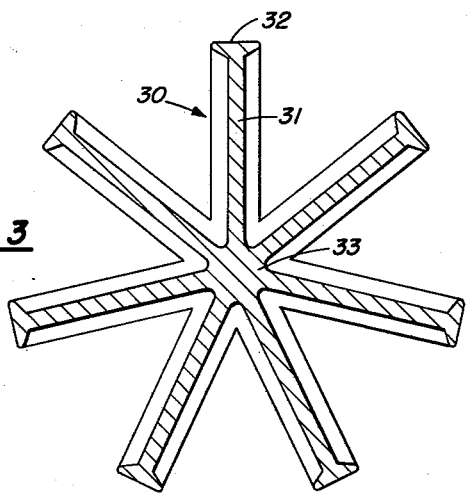
FIG. 3 is a section of the mandrel taken along lines 3—3 of FIG. 2.
Figure 2:
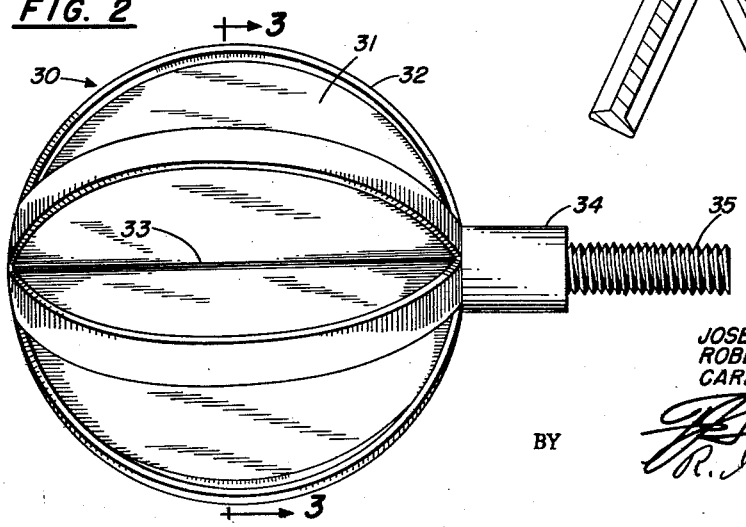
FIG. 2 is a side view of the mandrel which is insertable inside the rocket shell for forming the propellant charge.
Figure 4:
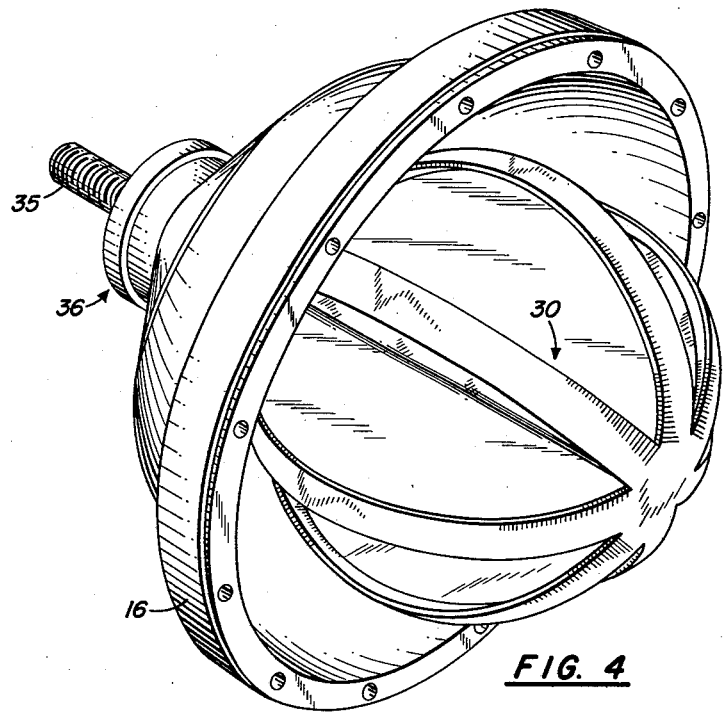
FIG. 4 is a perspective view of the rocket with the forward half of the shell removed showing the mandrel in place.
Figure 5:
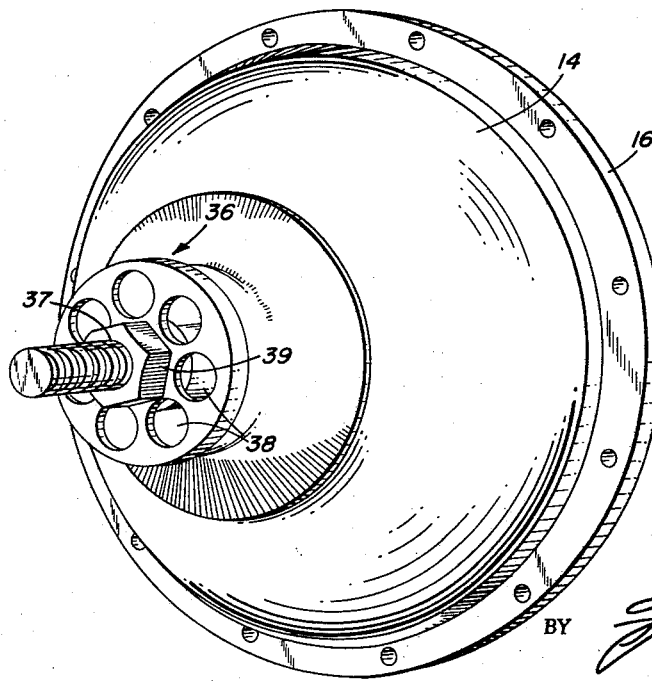
FIG. 5 is a perspective view of the rear half of the rocket shell.

The propellant or charge for the rocket is a solid which is contoured for effective burning action. While any solid propellant meeting rocket requirements may be used, tests were carried on with polysulfideperchlorate (Thiokol T-21), as this propellant is easy to mix and cast, gives good performance, is within the specified burning time over the entire operating-pressure range, and has a low pressure exponent $n$. To place this charge in the shell and at the same time form the charge so as to obtain the desired burning surfaces, use is made of a mandrel which may be inserted securely inside the shell and be subsequently removed by fusion after the charge has been pumped into the cell chamber and cured. While any desired shape of mandrel may be used, the form shown in FIG. 2 has been found adequate for the desired purpose. This mandrel 30 is cast of an eutectic alloy of bismuth, lead, tin and cadmium (known as Cerrobend) which may be in the proportions of bismuth 50.00, lead 26.70, tin 13.30, and cadmium 10.00, the alloy having a melting point of 158.0° F. As indicated in FIGS. 2 and 3, the mandrel 30 consists of a group of flat semicircular disks or plates 31 edged by perimeter strips 32, these disks being cast in one piece about a common core 33. The core is extended at one end to form cylinder 34 and the threaded terminal shank 35. The mandrel 30 is inserted in the rear shell hemisphere 14 of the rocket, as shown on FIG. 4, with the cylinder 34 lying in the space of coupler 24, the nozzle tube 25—26 having been removed. A centering device 36 (FIG. 5) is now placed over coupler 24 and secured thereto by any appropriate means, this device being shaped as a cap with a central hole 37 for reception of the mandrel shank 35 and a ring of holes 38 through the plate surface between the center hole 37 and the cap edge, the number of these holes, and their position, corresponding to the position of the spaces between mandrel plate sections about the mandrel axis. The cap structure is provided with an attached unit 39 for holding the mandrel and mandrel centering.

The leading shell section 13 of the sphere is now attached to the other section 14 by means of cap screws 19. The propellant, in an uncured liquid state, is forced into the shell through end cap openings 38 and cured in an oven for 4 days at a temperature of from 140° F. to 150° F. After cure is completed, the shell is inverted with the cap opening 38 down and the oven temperature raised to a value of from 160° F. to 165° F., thus melting the mandrel, the molten fluid escaping through cap openings 37 and 38 and leaving the solid propellant in its molded form. FIG. 6 illustrates the mold formation, this figure showing the radial cavities 40 which conform to the shape of disks 31 and perimeter strips 32 of mandrel 30 and thus have the shape of a plurality of radially extending disks each having a periphery defined by a substantially semicircular arcuate edge extending inwardly to open into the central cavity 41. The arcuate edges of disk-shaped portions 40 are of greater thickness at and adjacent to such edge than the portion thereof between such edge and central cavity portion 41 and the propellant sections 42 are thus distributed around the spherical chamber of the casing. This figure shows also the solid layer of propellant adjacent the shell interior, and it is apparent that this layer serves as a heat protection for the shell metal, direct heating of the shell occurring only approaching the end of the burning operation. This fact permits a thin shell metal to be used, the actual thickness as used varying from $\frac{1}{16}$ inch to $\frac{1}{25}$ inch.

After the main body of the mandrel alloy has been removed there remains a thin film of alloy, coating the propellant surface. It is important that this film be removed as otherwise it is impossible to ignite the propellant successfully. It was found that the film can be completely dissolved by mercury; and, hence, by filling the charge cavity with this substance the film is removed leaving a clean readily ignitable propellant surface. After film removal the centering cap is removed, an igniter 50 applied and the nozzle 12 inserted. The igniter is fabricated from thin gauze strips which are impregnated with a mixture of magnesium powder, potassium perchlorate, Vistanex and toluene. The impregnated gauze strips are inserted into the T-flares 43 (FIG. 6) along the outer perimeter of each segment. Two match squibs, connected by a 4 inch long, ¼ inch diameter cellophane tube filled with 3 grains of FFFG black powder, are used to ignite these gauze strips. A $\frac{1}{16}$ inch thick plastic blowout disk 51 is cemented in the nozzle throat to build up operating pressure quickly.

The procedure used in making and using the rocket may be apparent from the above description, but a brief review of this procedure is considered desirable. The mandrel is first formed so as to insure the desired burning areas on the propellant as inserted in the rocket chamber. The mandrel, which is of an alloy fusible at a temperature below that affecting the propellant, is then mounted in the rear half of the rocket cavity, the front half of the cavity is then sealed to the rear half to form a spherical unit, and propellant in liquid form forced into the cavity and cured. After curing, the propellant has solidified and on heating the charged shell to the temperature of alloy fusion but below the temperature of propellant disintegration, the mandrel substance is removed through the shell openings. The igniter materials are then inserted, and the rocket nozzle attached in the exit opening formed in the rear shell hemisphere.

The described construction lends itself to effective operation. FIG. 7 shows the thrust obtainable for varying values of chamber pressures for a 10 inch spherical rocket motor and Table I below gives firing test data for three separate charges 1, 2, and 3.

TABLE I

*Firing test data*

| Spherical rocket motor | Approximate propellant temperature, ° F. | Total impulse, lb.-sec. | Charge weight, lb. | Propellant impulse, lb.-sec./lb. |
| --- | --- | --- | --- | --- |
| 1 | 65 | 5,786 | 29.77 | 194 |
| 2 | 76 | 5,566 | 29.85 | 186 |
| 3 | 75 | 6,030 | 29.80 | 202 |

Taking test 1, for example, an average thrust of 1350 pounds for a duration of 4 seconds was obtained. Additionally, it is noted that the spherical one-unit shell form permits a charge with a volumetric loading factor of 95 percent or over and a variation from a mean value of burning surface of less than ±10 percent. Also, by adherence to the spherical form, an incremental velocity greater than 24,000 feet per second can be obtained at altitudes above 150,000 feet. In addition, the removable mandrel permits a three-dimensional, radial-burning one-piece propellant charge, the charge having an internal surface area greater than that of the interior surface of the shell. It is pointed out, also, that the radial charge formation resembles internal baffles and acts to suppress resonance. The described structure lends itself to multiple propellants to give two step control, for example; or a uniform thrust with a large surface charge may be used. In addition, progressive or regressive charges may be employed; spheres within spheres of charge may be used; and off-center charge cores may be utilized to control surface area as a function of time. An additional use of the described spherical structure is an inflow turbine during burning, if the rocket is spun up to an initial rotational velocity. While a solid metal shell is described for the rocket, it is important to note that modified structures may be used, such, as a shell 60 formed of wrapped Fiberglas filaments 61 with a plastic binder 62, such as acrylic resin, as indicated in FIG. 8.

Obviously many modifications and variations of the present invention are possible in the light of the above teachings. It is therefore to be understood that within the scope of the appended claims the invention may be practiced otherwise than as specifically described.

What is claimed is:

1. A solid propellant rocket motor comprising a pair of hemispheroidal casings rigidly secured together to form a substantially spherical casing, an aperture formed in one of said hemispheroidal casings, an internally threaded cylindrical annular plate secured to said one of said hemispheroidal casings adjacent to and surrounding said aperture, a nozzle for said motor comprising an externally threaded frusto-conical body having an axis and being in threaded engagement with said annular plate, an annular graphite insert of predetermined cross-sectional area mounted internally of said frusto-conical body; and a solid propellant filling said substantially spherical casing, said solid propellant forming a continuous layer of propellant adjacent the interior surface of said substantially spherical casing and having a cavity therein, said cavity having the shape of a central portion having an axis which is collinear with a diameter of said substantially spherical casing and coaxial with said nozzle axis, and further having the shape of a plurality of semi-circular disks extending radially outwardly from said central portion, each of said disk-shaped portions having an outer periphery defined by a substantially semi-circular arcuate edge and extending inwardly to open into said central cavity portion, and each of said disk-shaped portions being of greater thickness at and adjacent to said arcuate semi-circular edge thereof than at the portion thereof between said arcuate semi-circular edge and said central portion.

2. The rocket motor as set forth in claim 1, and including an igniter disposed in said thick arcuate semi-circular edge portions of said cavity.

References Cited in the file of this patent

UNITED STATES PATENTS

| | | |
|---|---|---|
| 2,395,406 | Goddard | Feb. 26, 1946 |
| 2,435,610 | Schneider | Feb. 10, 1948 |
| 2,448,658 | Carey | Sept. 7, 1948 |
| 2,500,334 | Zucrow | Mar. 14, 1950 |
| 2,555,080 | Goddard | May 29, 1951 |
| 2,603,061 | Avery | July 15, 1952 |
| 2,709,890 | Goddard | June 7, 1955 |
| 2,771,212 | Effinger | Nov. 20, 1956 |
| 2,816,721 | Taylor | Dec. 17, 1957 |
| 2,849,860 | Lowe | Sept. 2, 1958 |
| 2,900,168 | Nyborg | Aug. 18, 1959 |
| 2,902,822 | McKiernan | Sept. 8, 1959 |
| 2,920,443 | Higginson | Jan. 16, 1960 |

OTHER REFERENCES

A Quasi-Morphological Approach to the Geometry of Charges for Solid Propellant Rockets: The Family Tree of Charge Designs, by J. M. Vogel, published February 1956, in Jet Propulsion, pp. 102 to 105, vol. 26, No. 2.